US010096934B1

(12) United States Patent
Desjardins et al.

(10) Patent No.: US 10,096,934 B1
(45) Date of Patent: Oct. 9, 2018

(54) CABLE SUPPORT AND ATTACHMENT DEVICE

(71) Applicant: Amphenol Corporation, Wallingford, CT (US)

(72) Inventors: Mathieu Desjardins, Montreal (CA); Dimitri Laflamme, Longueuil (CA); Frederic Wallman, Longueuil (CA); Rachid Ouallou, Chambly (CA); Jeremi Proulx, St.-Hubert (CA)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 15/714,770

(22) Filed: Sep. 25, 2017

(51) Int. Cl.
| H01R 9/22 | (2006.01) |
| H01R 13/58 | (2006.01) |
| H02G 3/32 | (2006.01) |
| F16L 3/127 | (2006.01) |
| F16L 3/22 | (2006.01) |
| F16L 3/237 | (2006.01) |

(52) U.S. Cl.
CPC ............ *H01R 13/5841* (2013.01); *H02G 3/32* (2013.01); *F16L 3/127* (2013.01); *F16L 3/221* (2013.01); *F16L 3/237* (2013.01)

(58) Field of Classification Search
USPC ............................... 439/719; 248/68.1, 74.1
See application file for complete search history.

(56) References Cited

U.S. PATENT DOCUMENTS

| 2,407,217 | A | * | 9/1946 | Banneyer | ................. F16L 3/00 |
| | | | | | 248/68.1 |
| 7,686,259 | B2 | * | 3/2010 | Caveney | ............. B60R 16/0215 |
| | | | | | 211/85.5 |
| 7,770,852 | B2 | * | 8/2010 | Caveney | ............... F16B 5/0685 |
| | | | | | 248/68.1 |
| 8,888,053 | B2 | * | 11/2014 | Blanchard | ............... B64C 1/406 |
| | | | | | 248/68.1 |
| 9,377,135 | B2 | * | 6/2016 | Karls | ....................... F16L 3/222 |
| 9,470,252 | B2 | * | 10/2016 | Karls | ........................ F16B 2/04 |
| 9,689,511 | B1 | * | 6/2017 | Thornton | .................. F16B 1/00 |

* cited by examiner

*Primary Examiner* — Tho D Ta
(74) *Attorney, Agent, or Firm* — Blank Rome LLP

(57) ABSTRACT

A cable attachment device is formed of a support member and at least one cable adapter. The support member has an elongated support post having inner column with at least two opposing notches formed along a length thereof. The at least one cable adapter has an inner surface and an outer surface and is configured to be inserted onto the support member. The cable adapter also has at least one tab and at least two opposing resilient prongs extending inwardly from the inner surface of the cable adapter, and at least one handle extending outwardly from the outer surface of the cable adapter configured to secure at least one wire or cable thereto. The at least two opposing resilient prongs are configured to engage the at least two opposing notches on the inner column of the support member to secure the cable adapter thereto.

19 Claims, 8 Drawing Sheets

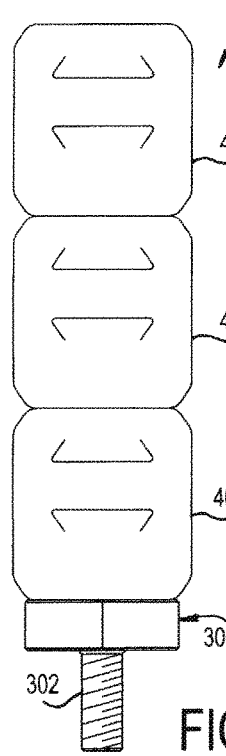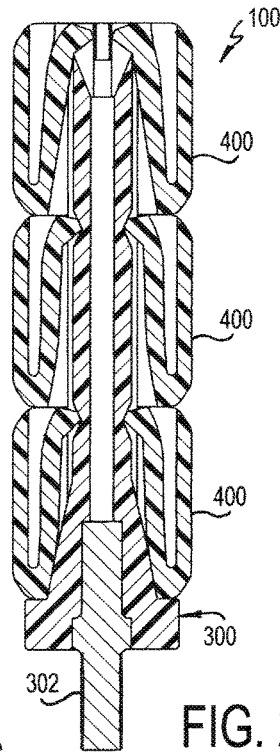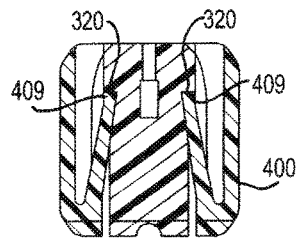
FIG. 2A  FIG. 2B  FIG. 2C
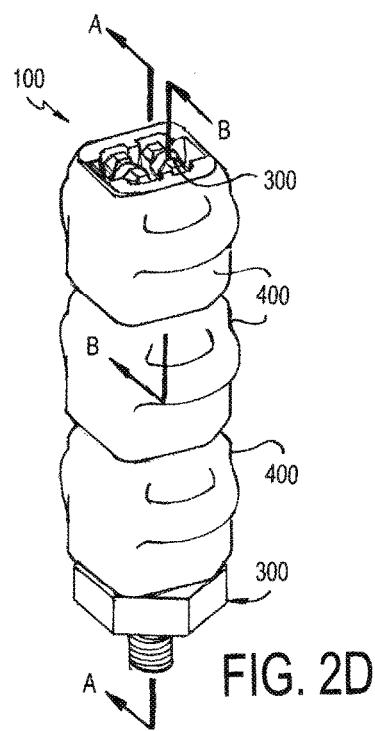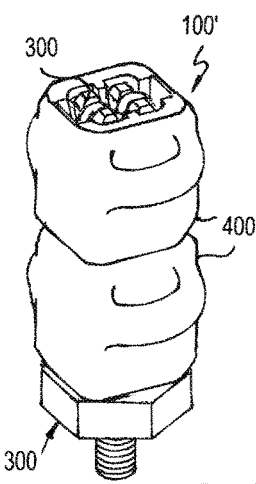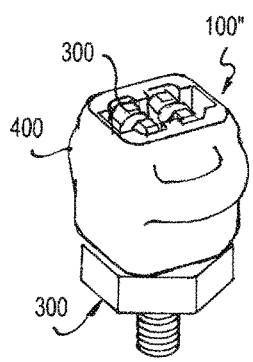
FIG. 2D  FIG. 2E  FIG. 2F

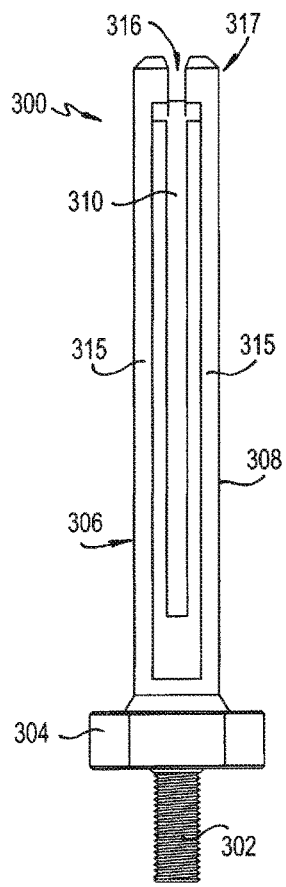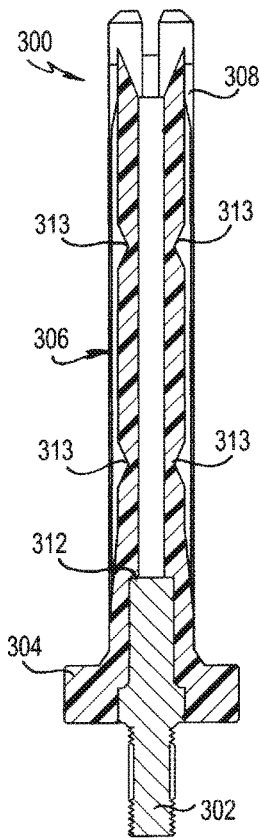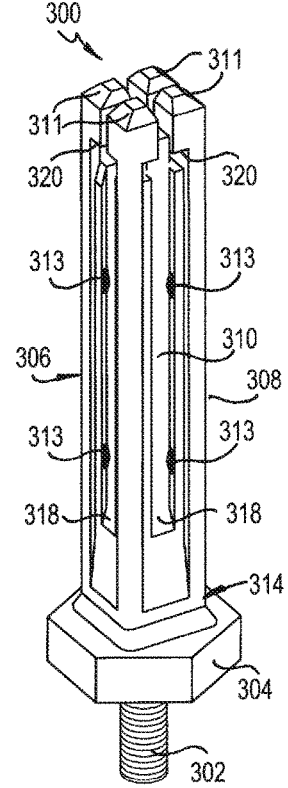
FIG. 3A  FIG. 3B  FIG. 3C
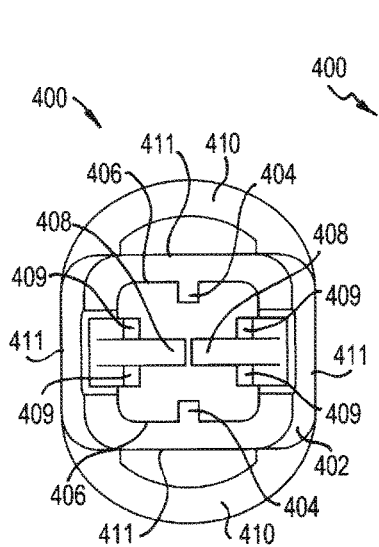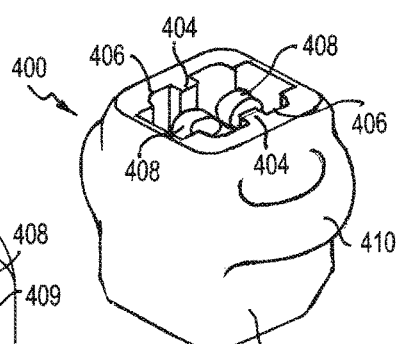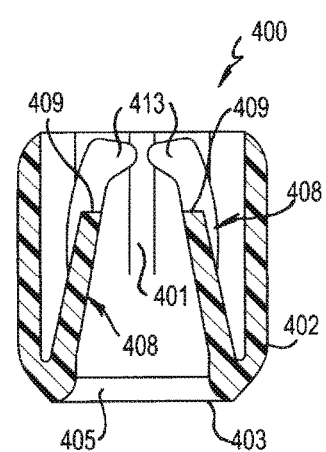
FIG. 4A  FIG. 4B  FIG. 4C

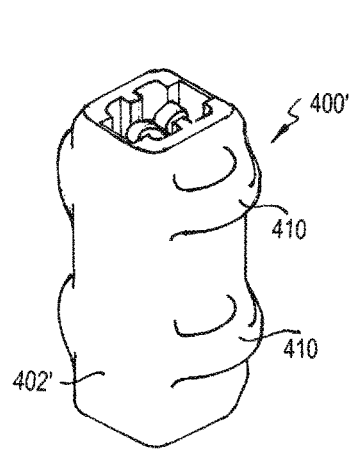
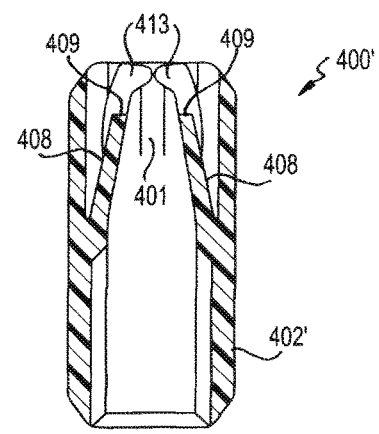
FIG. 4D  FIG. 4E
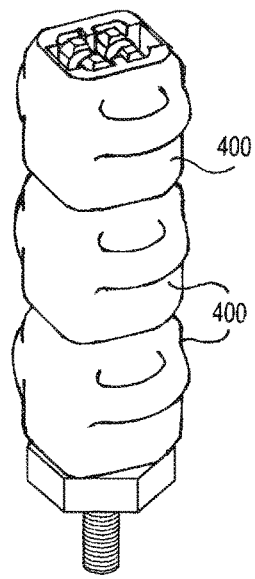
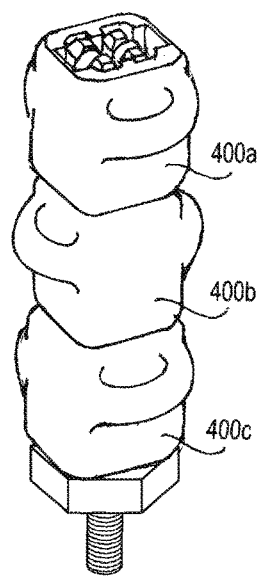
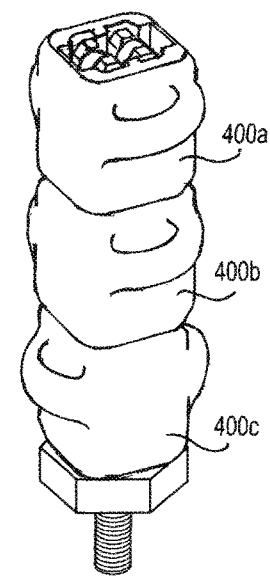
FIG. 5A  FIG. 5B  FIG. 5C
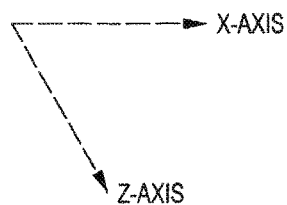

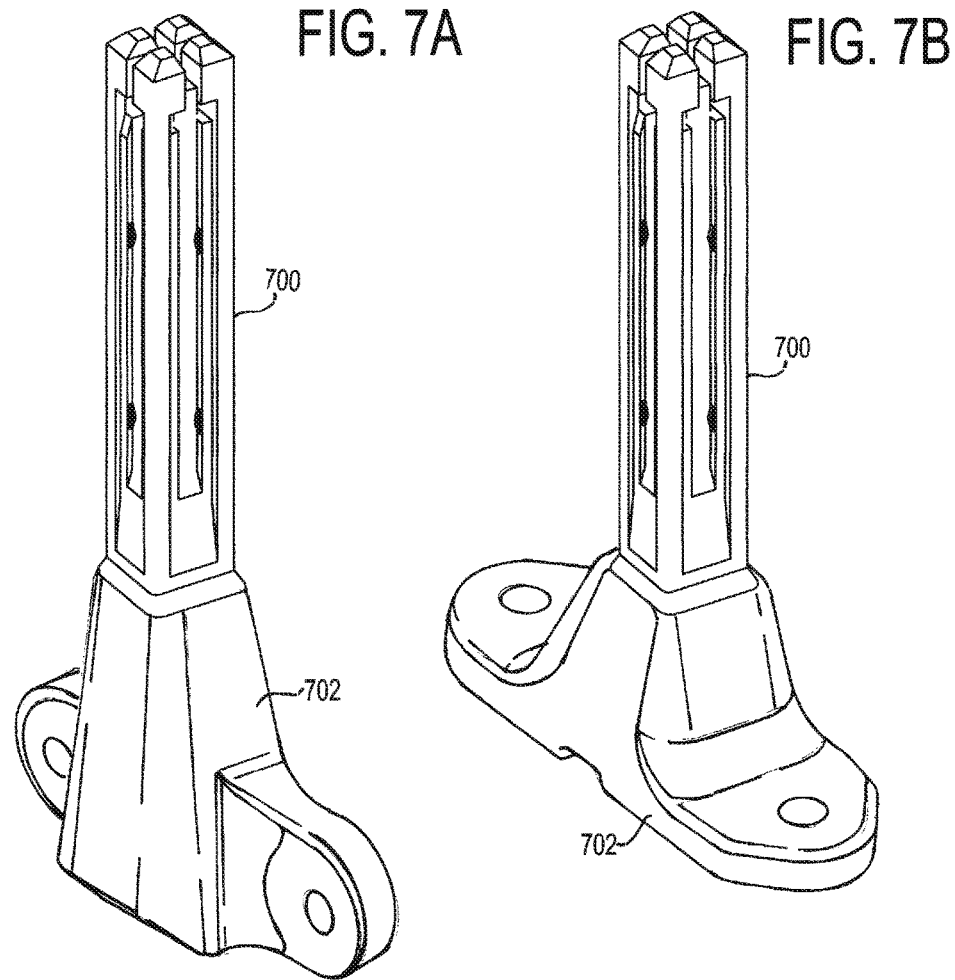
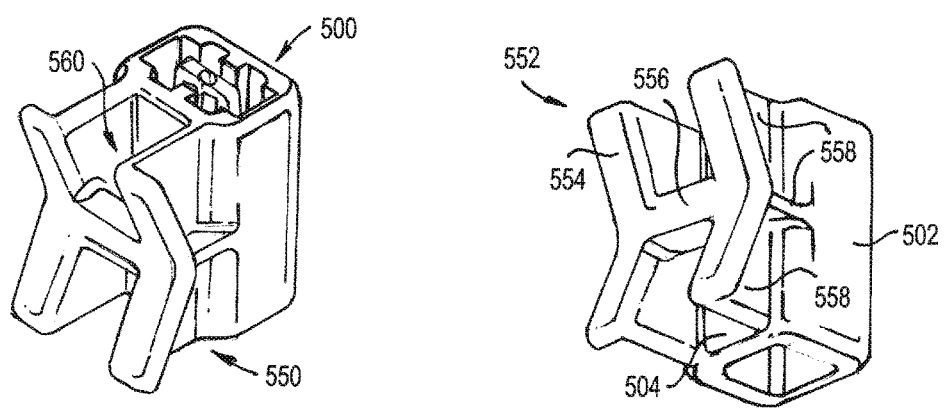

CABLE SUPPORT AND ATTACHMENT DEVICE

FIELD OF THE INVENTION

The present invention relates to the field of cable support and attachment devices. More particularly, the invention is directed to assemblies for supporting and attaching cables or wires to a structure, such as an aircraft.

BACKGROUND OF THE INVENTION

Cables or wires often need to be bundled and attached to an underlying structure, such as an aircraft. In this way, cables can be connected to various electronic components located in different positions on the aircraft. Typically, the cables are bundled using conventional bundling means, such as cable ties, and attached to structures on the aircraft using permanent or semi-permanent fasteners, such as screws or bolts. This requires a technician to attach bundled cables to the underlying structure with tools, which increases installation time and cost. The need to use tools also decreases the ability to place bundled cables in hard-to-reach areas, as those tools are often unable to be maneuvered into small spaces and are not ergonomic for the technician. Lastly, permanent or semi-permanent attachment means are typically not able to be removed easily, which is problematic should the cables need repair or replacement.

Accordingly, there is a need for a simple cable support and attachment device that can be removably coupled to the underlying structure for ease of attachment and removal, installed quickly without complicated tooling, and which is easy to handle by the technician for attachment in hard-to-reach areas.

SUMMARY OF THE INVENTION

Accordingly, an object of the invention is related to a cable attachment device which includes a support member having an elongated support post, the elongated support post having an inner column with at least two opposing notches formed along a length thereof, and at least one cable adapter having an inner surface, an outer surface, and a central bore, the central bore configured to slidably receive the support member. The cable adapter has at least two opposing resilient prongs extending inwardly from the inner surface of the cable adapter into the bore, and at least one cable attachment member extending outwardly from the outer surface of the cable adapter configured to secure at least one wire or cable thereto. The at least two opposing resilient prongs are configured to engage the at least two opposing notches on the inner column of the support member to secure the cable adapter thereto.

The invention is further directed to a method of securing cables to a structure, which includes the steps of: coupling at least one cable or wire to at least one cable adapter, attaching a support member to the structure, and inserting the at least one cable adapter onto the support member to secure the at least one cable or wire to the structure. The at least one cable adapter has an inner surface, an outer surface, and a central bore, the central bore being configured to slidably receive the support member. The at least one cable adapter further has at least two opposing resilient prongs extending inwardly from the inner surface into the bore, and at least one cable attachment member extending outwardly from the outer surface configured to secure at least one wire or cable thereto. The support member has an elongated support post which is formed of an outer housing and an inner column having at least two opposing notches formed along a length thereof. The at least two opposing resilient prongs on the at least one cable adapter are configured to engage the at least two opposing notches on the inner column of the support member to secure the cable adapter thereto.

These and other objects of the invention, as well as many of the intended advantages thereof, will become more readily apparent when reference is made to the following description, taken in conjunction with the accompanying drawings.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein:

FIG. 2A is a side plan view of an assembled cable attachment device according to an embodiment of the invention;

FIG. 2B is a cross-sectional side view of the assembled cable attachment device of FIG. 2A, taken along line A-A of FIG. 2D;

FIG. 2C a cross-sectional side view of the uppermost cable adapter of the assembled cable attachment device of FIG. 2A, taken along line B-B of FIG. 2D;

FIG. 2D is a perspective view of the assembled cable attachment device of FIG. 2A;

FIG. 2E is a perspective view of an assembled cable attachment device having two cable adapter according to an embodiment of the invention;

FIG. 2F is a perspective view of an assembled cable attachment device having one cable adapter according to an embodiment of the invention;

FIG. 3A is a side plan view of a male support member according to an embodiment of the invention;

FIG. 3B is a cross-sectional side view of the male support member of FIG. 3A;

FIG. 3C is a top perspective view of the male support member of FIG. 3A;

FIG. 4A is a top view of a female cable adapter according to an embodiment of the invention;

FIG. 4B is a perspective view of the female cable adapter of FIG. 4A;

FIG. 4C is a side cross-sectional view of the female cable adapter of FIG. 4A;

FIG. 4D is a perspective view of a female cable adapter according to another embodiment of the invention;

FIG. 4E is a side cross-sectional view of the female cable adapter of FIG. 4D;

FIG. 5A is a perspective view of an assembled cable attachment device having three female cable adapters with handles oriented along the same axis according to an embodiment of the invention;

FIG. 5B is a perspective view of an assembled cable attachment device having three female cable adapters with handles oriented along two different axes according to an embodiment of the invention;

FIG. 5C is a perspective view of an assembled cable attachment device having three female cable adapters with handles oriented along two different axes according to another embodiment of the invention;

FIG. 7A is a perspective view of a male support member according to another embodiment of the invention;

FIG. 7B is a perspective view of a male support member according to another embodiment of the invention;

FIGS. 8A-8E show a cable adapter having one or more cradle coupling mechanisms;

DETAILED DESCRIPTION OF PREFERRED EMBODIMENTS

Figure 1A:
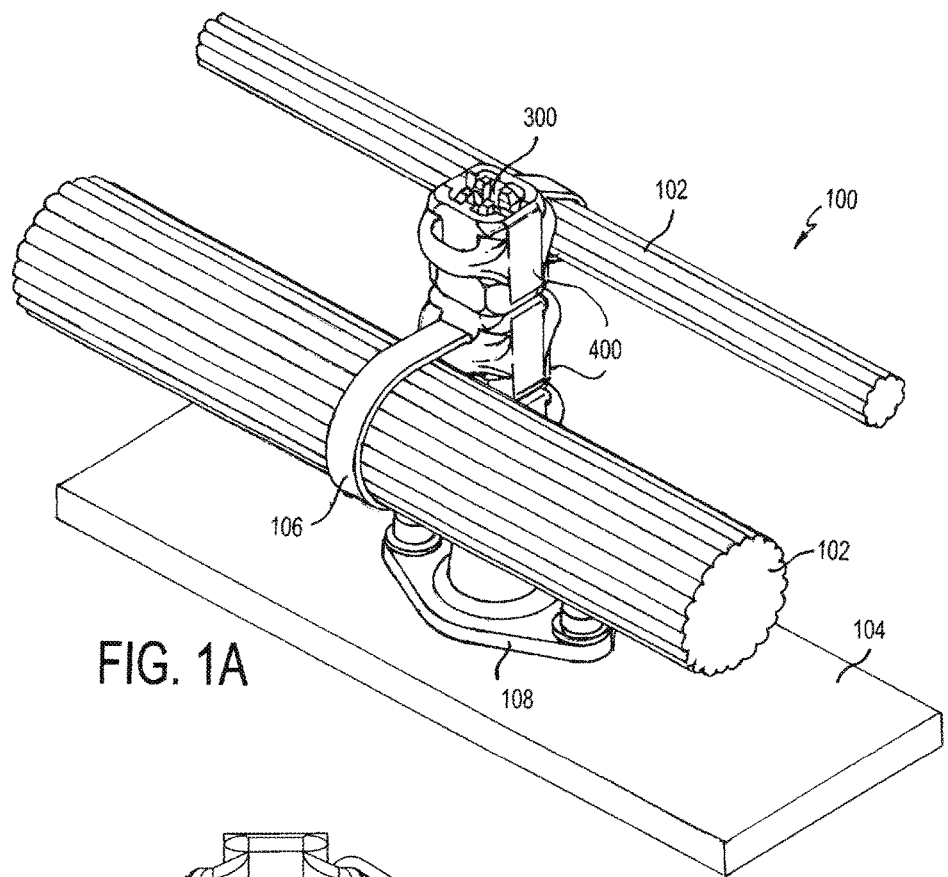
FIG. 1A is a perspective view of a cable support and attachment device according to an embodiment of the invention.
Figure 1B:
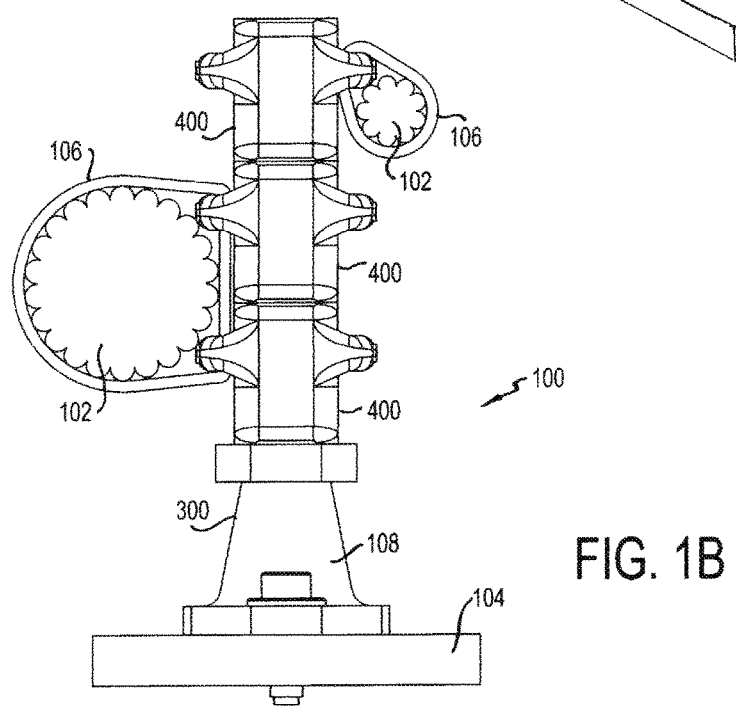
FIG. 1B is a side plan view of the cable support and attachment device of FIG. 1A.

As illustrated in the Figures, the invention relates to a cable support and attachment device 100 that is generally formed of a male support member 300 (hereinafter, "support member 300") and at least one female member or cable adapter 400 (hereinafter, "cable adapter 400"). As shown in FIGS. 1A-1B, the attachment device 100 can be used to secure one or more cables 102 to an underlying stationary base 104. In use, the stationary base 104 may be integral with the aircraft (e.g., part of the aircraft housing) or permanently coupled to the aircraft, such that when the attachment device 100 is coupled to the stationary base 104, the cables 102 may be held in place. In one embodiment, the support member 300 may be coupled to the stationary base 104 through any known attachment means, such as, for example, screws or bolts.

FIGS. 2A-D illustrate one embodiment of an assembled attachment device 100 ("the attachment device 100") of the invention. FIG. 2B is a cross-sectional view of the side of the attachment device 100 illustrated in FIG. 2A, taken along line A-A of the device 100 illustrated in FIG. 2D. The attachment device 100 is generally formed of two primary components, a stationary support member 300 and at least one cable adapter 400. The cable adapter 400 is inserted onto the support member 300, as discussed more fully below. As illustrated in these figures, the attachment device 100 has three cable adapters 400 in stacked formation, but any number (one or more) may be used for a particular application. For example, as illustrated in FIG. 2E, the attachment device 100' may have two cable adapters 400, or as illustrated in FIG. 2F, the attachment device 100" may have one cable adapter 400. The number of cable adapters 400 that are used may be dictated by the particular application, the number of cables that need to be secured, or the size of the space in which the device 100 is to be attached to the stationary base 104.

FIG. 2C is a side cross-sectional view of the uppermost cable adapter of the assembled cable attachment device of FIG. 2A. In this view, the cross section is taken along line B-B of the device illustrated in FIG. 2D. FIG. 2C illustrates how the uppermost cable adapter 400 locks in place when positioned on the support member 300, as will be discussed more fully below.

The stationary support member 300 ("the support member 300") is illustrated in more detail in FIGS. 3A-C. FIG. 3B is a cross-sectional view of the support member 300 illustrated in FIG. 3A. The support member 300 is generally formed of a threaded base 302, a neck portion 304, and an elongated support post 306. The threaded base 302 and the neck portion 304 allow the support member 300 to be attached to the stationary base 104. For example, the stationary base 104 may include a threaded opening that receives the threaded base 302 of the support member 300 to couple the support member 300 to the stationary base 104. Alternatively, as illustrated in FIG. 1B, the stationary base 104 may have an internally-threaded bracket 108 that is coupled to the stationary base 104 and configured to receive the threaded base 302 of the support member 300. It will be recognized that the support post 306 can be coupled with the base 104 in any suitable manner.

The elongated support post 306 ("the support post 306") of the stationary support member 300 is generally formed of an outer housing 308 and an inner column 310. The outer housing 308 generally forms a square cross-sectional shape, although any cross-sectional shape may be used. At least one elongated slot or opening 318 is formed in at least one side of the outer housing 308. As illustrated in FIG. 3C, elongated openings 318 can only be seen on two sides, but an elongated opening 318 is provided on the other two sides not shown as well. Preferably, each side of the outer housing 308 has at least one elongated opening 318.

The inner column 310 is an elongated member with a majority of its length positioned within the outer housing 308. As illustrated in FIG. 3B, a bottom portion 312 of the inner column 310 may be formed integrally with the neck portion 304 of the support member 300. In an alternative embodiment, the bottom portion 312 of the inner column 310 and the neck portion 304 are formed as separate components and are coupled together. The distal end of the bottom portion 312 of the inner column 310 also engages the threaded base 302 or can be formed integrally with the threaded base 302.

The inner column 310 further includes at least one pair of notches 313 spaced apart and formed along a length thereof. Each pair of notches may be aligned with each other, such as being formed directly opposite each other on opposing sides of the inner column 310 along its length. In another embodiment where the inner column 310 has a square cross-section, the inner column 310 may include notches 313 on all four sides positioned at parallel positions along its length. The notches 313 are designed to engage with the prongs 408 of the cable adapters 400 to secure them in place when inserted onto the support post 306, as discussed more fully below. As can be seen in FIG. 3B, an inner column 310 is provided having two pairs of notches 313 with a first notch 313 at a first location on the column 310 and a second notch 313 at a second location on the column 310, but any number of pairs of notches 313 may be used depending on how many cable adapters 400 will be used in a particular application.

The outer housing 308 has a first proximal end 314 adjacent to the neck portion 304 and a second opposing distal end 316. At or adjacent to the second opposing end 316, the housing 308 is formed with at least one lip 320 where the opening 318 between the elongated members 311 of the outer housing 308 is narrowed. The lip 320 engages with the uppermost cable adapter 400 to hold it in place when the cable adapters 400 are inserted onto the support post 306. Specifically, when the uppermost cable adapter 400 is inserted onto the support post 306, its prongs 408 (as discussed more fully below) have a locking edge 409 that engages the lip 320 to secure the cable adapter 400 in place. This uppermost cable adapter 400 then holds each of the cable adapters 400 beneath it in place as well.

As best shown in FIG. 3C, the outer housing 308 is generally formed of four elongated arms or members 311 that extend along each corner of the inner column 310, along the entire length of the inner column 310, and above the inner column 310 at the distal end 316 of the support post 306. Each of the elongated members 311 is connected to the bottom portion 312 of the inner column 310 at the proximal end 314 of the support post 306. Each of the members 311 is unconnected at the distal end 316 to allow for removal of the cable adapters 400. Each of the members 311 has an elongated body 315 and a widened head 317. The head 317 of each prong 311 is wider at the distal end 316 and extends over the distal end of the inner column 310 and inwardly to form the inward lip 320. In one embodiment, the arrangement of the members 311 forms the inner column 310, such that the inner column 310 is not a separate unitary piece.

In one embodiment, each component of the support member 300 may be formed separately and coupled together, or one or more may be formed together integrally as one unitary piece. For example, the threaded base 302, neck portion 304, and support post 306 may all be formed as one integral piece. Further, the outer housing 308 and inner column 310 of the support post 306 may also be formed as one integral piece or as separate pieces and coupled together.

The cable adapter 400 is shown in greater detail in FIGS. 4A-4C. FIG. 4C is a cross-sectional view of the cable adapter 400 illustrated in FIGS. 4A and 4B. Each cable adapter 400 is generally formed of a housing 402. In a preferred embodiment, the housing 402 generally has four sides 411 that define a hollow square or cube shape with a central opening or space 401 extending through the entire length of the housing 402. A proximal end surface 403 of the housing 402 preferably has a chamfered edge 405 to allow for ease of installation onto the support member 300.

On the inside 401 of the housing 402, the cable adapter 400 includes at least one tab 404 and at least one resilient prong 408 formed integrally with the housing 402, as illustrated in FIGS. 4A and 4C. In an alternative embodiment, either or both of the tab(s) 404 and the resilient prong(s) 408 may be formed as separate components and coupled to the inside of the housing 402. While not limited to such an embodiment, the cable adapter 400 preferably has two opposing tabs 404 on opposing sides of the housing 402 and two opposing resilient prongs 408 on the other two opposing sides of the housing 402.

The at least one tab 404 helps to prevent rotation when the cable adapter 400 is on the support member 300. The tab(s) 404 project perpendicularly inward from an inner surface 406 of the inside of the housing 402 into space 402 and extend into the elongated openings 318 formed in the sides of the outer housing 308 of the support member 300. In this way, the tab(s) 404 prevent rotational movement of the cable adapter 400 when in use and ensure alignment between the support member 300 and the cable adapter 400. The tabs 404 also help guide the cable adaptor 400 when being placed on and removed from the support member 300, and support the cable adaptor 400 when positioned on the support member 300.

The resilient prong(s) 408 each have an upper curved portion 413 and a locking edge(s) 409 positioned beneath the upper curved portion 413. As illustrated in FIG. 4A, the locking edges 409 extend beyond the sides of the upper curved portions 413 of the resilient prongs 408 (i.e., are wider than the upper curved portions 413). The upper curved portions 413 engage the notch(es) 313 of the support post 306 to hold the lower cable adapters 400 in place on the support post 306, as illustrated in FIG. 2B. The upper curved portions 413 of the resilient prong(s) 408 are flexible and biased inward relative to the housing 402 of the cable adapter 400, such that when the cable adapter 400 is inserted onto the support post 306 of the support member 300, the curved portions 413 of the prongs 408 press inward against the notches 313 and lock the cable adapter 400 in place.

Turning to FIG. 2C with respect to the uppermost cable adapter 400, the locking edges 409 of each prong 408 function to releasably lock the cable adapter 400 onto the support member 300, thereby securing all of the lower cable adapters 400 as well. When the uppermost cable adapter 400 is fully inserted onto the support post 306, the upper curved portions 413 of the prongs 408 rest against the edge of the elongated members 311 of the outer housing 308. The locking edges 409 of the prongs 408 are aligned just beneath the lip 320 on the outer housing 308, so as to prevent vertical movement of the uppermost cable adapter 400. Thus, the topmost adapter 400 is locked in place so that it does not slide off of the support post 306, thereby securing the lower cable adapters 400 onto the support post 306 as well.

Each prong 408 connects at the bottom, proximal end of each of the sides 411 and extend upward and inward into the space 401. As shown in FIG. 4C, the upper curved portions 413 of the prongs 408 are angled inwardly with respect to the sides 411. In this way, the space 401 formed between adjacent prongs 408 is narrower at the top of the housing 402 than at the bottom of the housing 402. In use, the support member 300 is received between these adjacent prongs in the narrowed passage. When the cable adapter 400 is inserted onto the support member 300, the support member 300 pushes the prongs 408 apart against their bias and the cable adapter 400 is slidably received onto the support member 300. The prongs 408 are preferably formed as one, unitary piece, i.e., the upper curved portions 413 and the locking edges 409 are formed integrally as one unitary body.

Each cable adapter 400 also includes at least one cable attachment member, such as a handle 410, formed on the outside of the housing 402. The handle 410 may be in the form of an arc shape which extends from one corner of the outer surface of the housing 402 to another. The handle 410 provides the attachment means for the cables or wires 102 (hereinafter, collectively referred to as "cables 102"). For example, a bundle of cables 102 may be attached to the handle 410 by means of a cable tie 106 that is looped through the handle 410 and around the bundle of cables 102 to secure them in place (see FIGS. 1A-B). In use, each of the cable adapters 400 is preferably first attached to the bundle of cables 102 using, for example, a cable tie 106. Next, the support member 300 of the attachment device 100 is coupled to the stationary base 104. Lastly, the cable adapters 400, with the bundle of cables 102 coupled thereto, are inserted onto the support member 300 and snapped into place. In this way, no tooling is needed to secure the cables 102 to the stationary base 104. As illustrated in FIG. 1B, cable ties 106 may be looped through one handle 410 on one cable adapter 400, particularly for a smaller bundles of cables 102 as illustrated on the right side of the figure, or a cable tie 106 may be looped through two stacked handles 410 on two stacked cable adapters 400 to accommodate a larger bundle of cables 102, as illustrated on the left side of the figure. It is also apparent that the cable adapter 400 can first be coupled with the support member 300, and then the cables 102 attached to the cable adapter 400. In alternative embodiments, other conventional means of securing cables to a structure may be used, such as those shown in FIGS. 8A-8J.

In one embodiment, as illustrated in FIG. 4A, the housing 402 has two handles 410 formed on opposing sides. In an alternative embodiment, the housing 402 may have a handle 410 on one side, three sides, or all four sides depending on the needs of a particular application. In an alternative embodiment illustrated in FIGS. 4D-4E, a cable adapter 400' may have more than one handle 410 on one side. The housing 402' is the same as housing 402 illustrated in FIG. 4C, but it has a relatively longer length in order to accommodate the additional handles 410 positioned on the outer surface of the housing 402.

The components of the attachment device 100 may be formed of any material known in the art that is suitable for attachment to an aircraft. In one embodiment, the support member 300 and cable adapters 400 are formed of a polymer material, such as polyamides (e.g., nylon), polyimides, acrylic, polyvinyl chloride (PVC), polypropylene (PP), high-density polyethylene (HDPE), polystyrene, polyethylene terephthalate (PET), polyetherimide (PEI), polyphenylene sulfide (PPS), polyether ether ketone (PEEK), acrylonitrile butadiene stryrene (ABS) and polycarbonate (PC). Such materials provide the necessary strength to support the cables 102, but are also inexpensive and lightweight, which is important for use in aircrafts.

In operation, the support member 300 is first attached to the underlying structure, which may be the stationary base 104. Next, or simultaneously, the cables 102 are attached to the cable adapter 400 as set forth above. The cable adapter 400 (carrying the cables 102) is then slid over the support member 300. The distal end 316 of the support member 300 separates the prongs 408. Once the prongs 408 pass the entire length of the support member 300, they return to their inward, biased state, thus locking the cable adapter 400 to the support member 300 and against the lip 320. The prongs 408 then slide into the openings 318 on the outer housing 308 of the support member 300 and against the inner column 310. The tabs 404 also slide into their adjacent openings 318 on the outer housing 308. The cable adapter 400 is slid to the proximal end 314 of the support member 300. The notches 313 give tactile feedback to the cable adapter 400. Additional cable adapters 400 may then be slid over the support member 300. The lip 320 on the outer housing 308 prevents the top cable adapter 400 from detaching from the support member 300.

As illustrated in FIGS. 5A-C, the cable adapters 400 may be installed on the support member 300 in any lateral orientation. For example, in FIG. 5A, all of the handles 410 of the cable adapters 400 are oriented such that they extend along the X-axis, as indicated. In FIG. 5B, the top and bottom cable adapters 400a and 400c, respectively, are oriented such that their handles 410 extend along the X-axis, but the middle cable adapter 400b is oriented such that its handles 410 extend along the Z-axis. In FIG. 5C, the top and middle cable adapters 400a and 400b have their handles 410 oriented such that they extend along the X-axis, while the bottom cable adapter 400c has its handles 410 extending along the Z-axis. In this way, some of the handles 410 may extend in a perpendicular direction relative to handles 410 on adjacent cable adapters 400. The embodiments illustrated in FIGS. 5A-C are intended only as examples, and each of the cable adapters 400 on any given attachment device 100 may be oriented in the same direction or a combination of different directions as needed for a particular application.

Figure 6A:
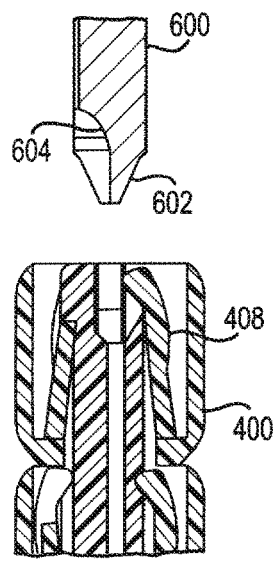
FIG. 6A is a side cross-sectional view of a female cable adapter an a female cable adapter removal tool according to an embodiment of the invention.
Figure 6B:
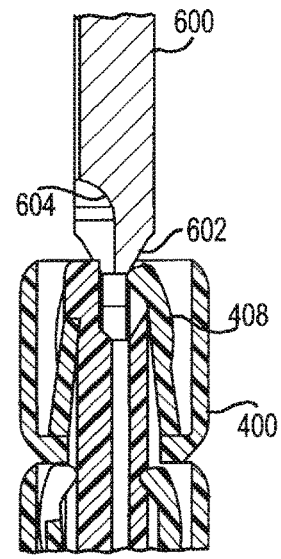
FIG. 6B is a side cross-sectional view of a female cable adapter an a female cable adapter removal tool being inserted into the female cable adapter.
Figure 6C:
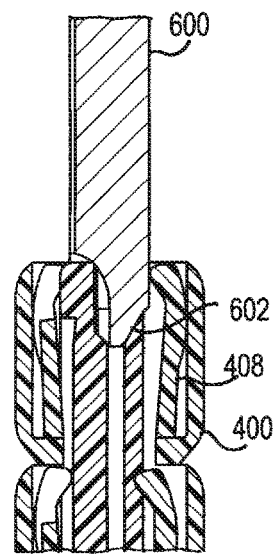
FIG. 6C is a side cross-sectional view of a female cable adapter an a female cable adapter removal tool inserted into the female cable adapter and in a rotated position.
Figure 6D:
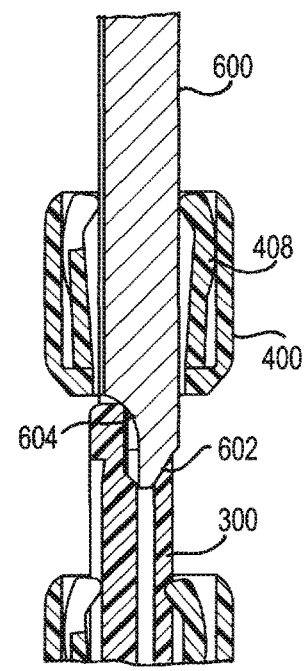
FIG. 6D is a side cross-sectional view of a female cable adapter being removed from a male support member by a removal tool.

The attachment device 100 of the invention is easy to install and does not require the use of special tooling. Further, the uppermost cable adapter 400 may be easily removed from the support member 300 in the event that the cables need to be repaired or replaced. As illustrated in FIGS. 6A-D, a standard Phillips head screwdriver 600 may be used to quickly remove the uppermost cable adapter 400 from the support member 300. As shown in FIGS. 6B and 6C, the head 602 of the screwdriver 600 is inserted into housing 402 of the cable adapter 400. As it is pushed downward into the cable adapter 400, the ramps 604 on the head 602 of the screwdriver 600 push the prongs 408 on the inside of the housing 402 outward and beyond the lip 320. The prongs 408 are held in this position as they rest on the surface of the screwdriver head 602. In this extended outward position, the prongs 408 are now expanded beyond the width of the outer housing 308 of the support post 306, so that the cable adapter 400 can be lifted upward and removed from the support post 306.

In another embodiment, a cable adapter 400 may be removed from the support member 300 using standard retaining ring pliers (not shown). In this embodiment, the prongs 408 are designed to engage the head of the ring pliers, such that the pliers can be used to bias the prongs 408 open to allow for removal of the cable adapter 400 from the support member 300. For example, the tip of the upper curved portion 413 of each prong may have an inward-facing notch designed to engage the plier heads so that the pliers can be used to push the upper curved portion 413 outward, thereby extending the prongs 408 to the position where the cable adapter 400 can be removed from the support post 306.

In an alternative embodiment, as illustrated in FIGS. 7A-B, the support member 700 can be designed without a threaded base 302. Instead, support member 700 has an attachment base 702 that allows for direct coupling to the aircraft. In this way, the need for the stationary base 104 is eliminated. In FIG. 7A, the attachment base 702 is configured vertically, i.e., in the same vertical plane as the support post 306. In FIG. 7B, the attachment base 702 is configured perpendicularly with respect to the vertical plane of the support post 306. In these embodiments, the attachment base 702 may be attached to the aircraft using conventional attachment means, such as with screws or bolts, or it may be adhered to the aircraft using known adhesive materials (e.g., two-sided tape).

Figure 8C:
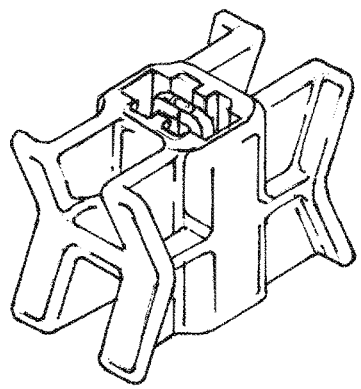
Figure 8D:
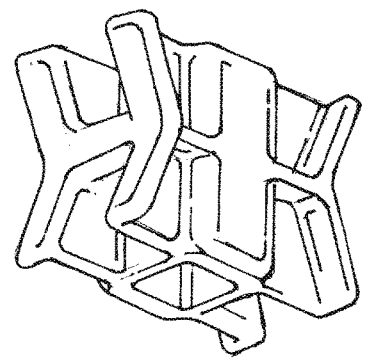
Figure 8E:
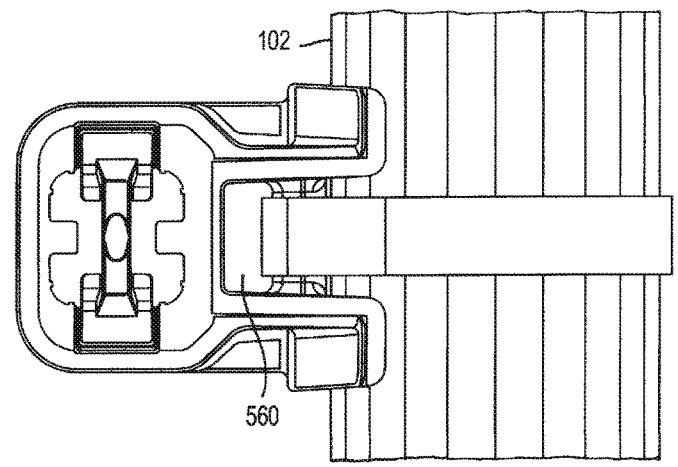

Referring to FIGS. 8A-8J, as mentioned above the cable adapter 500 can be configured in other suitable manners to couple with cable 102 or cable bundles. FIGS. 8A-8B show an adapter having a cable coupling mechanism 550 at one side of the cable adapter, and FIGS. 8C-8D show the same cable coupling mechanism 550 at two opposing sides of the cable adapter. The cable coupling mechanism 550 has two bent arms 554 and a cross-support member 556 extending between the two bent arms 554. The cross-support member 556 is substantially orthogonal to the arms 554 and has a first end coupled with the first arm and a second end coupled with the second arm, to form a general H-shape. The arms 554 and cross-support member 556 together form a cradle 552. The arms 554 are bent at the middle to conform to the shape of the cable or cable bundle 102 to prevent the cable 102 from slipping out of the cradle 552. Each arm 554 has one or more support members (or "legs") 558 that extend outward from the side surface 504 of the cable adapter body 502 so that the cradle 552 is spaced slightly apart from the side surface 504 of the cable adapter body 502. As best shown in FIG. 8E, an opening 560 is provided behind the cross-support member 556 between the cross-support member 556 and the outer side surface 504 of the cable adapter. A cable tie or the like can be placed through the opening 560 to connect the cable 102 to the cable adapter.

As shown in FIGS. 8A-8E, the arms 554 can be aligned substantially parallel to the longitudinal axis of the support 300, so that the cable 102 extends substantially perpendicular to the longitudinal axis of the support 300. However, the arms 554 can be aligned substantially perpendicular to the longitudinal axis of the support 300, so that the cable 102 extends substantially parallel to the longitudinal axis of the support 300.

Figures 8F, 8G:
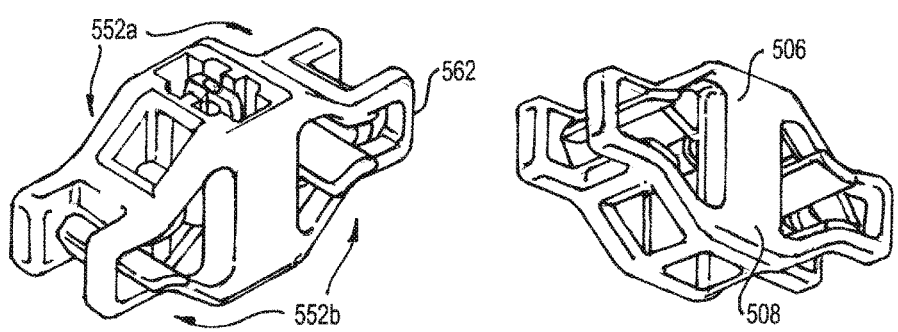
FIGS. 8F-8G show a cable adapter with dual cradle coupling mechanisms.

Turning to FIGS. 8F-8G, a cable adapter is shown having two cable coupling mechanisms 550. Here, the cable coupling mechanism 550 is a stacked configuration, whereby each coupling mechanism 550 has an upper cradle 552a and a lower cradle 552b. Each cradle 552a, 552b is formed with bent arms 554 and a cross-support member 556, as in FIGS. 8A-8E. However, the arms 554 and cross-support member 556 do not have support members 558. Rather, a first end of the arm 554 of the upper cradle 552a is directly coupled to a top portion 506 of the cable adapter body 502, and a second end of the arm 554 of the upper cradle 552a is coupled to a first end of a bridge support member 562. In addition, a first end of the arm 554 of the lower cradle 552b is directly coupled to a bottom portion 508 of the cable adapter body 502, and a second end of the arm 554 of the lower cradle 552b is coupled to a second end of the bridge support member 562. A cable tie can be received in the opening 560 of each of the upper and lower cradles 552a, 552b so that a first cable or cable bundle 102 can be coupled with and received by the upper cradle 552a and a second cable or cable bundle 102 can be coupled with and received by the lower cradle 552b for each coupling mechanism 550. As shown, the coupling mechanisms 550 of FIGS. 8A-8G are integrally formed with the cable adapter body 502.

Figure 8H:
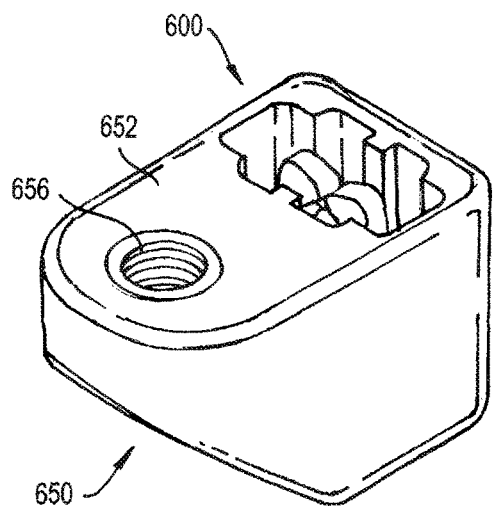
FIGS. 8H-8J show a cable adapter with a platform coupling mechanism.
Figure 8I:
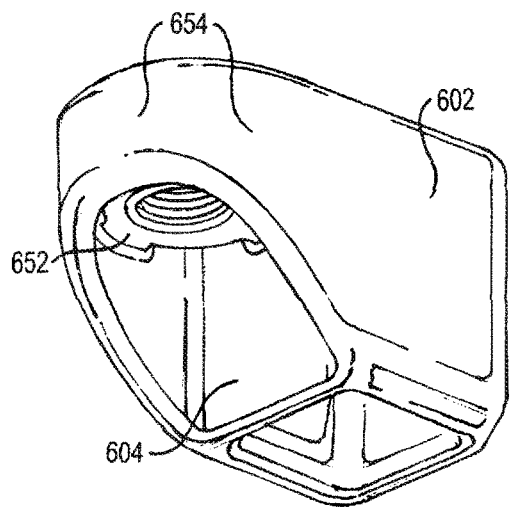
Figure 8J:
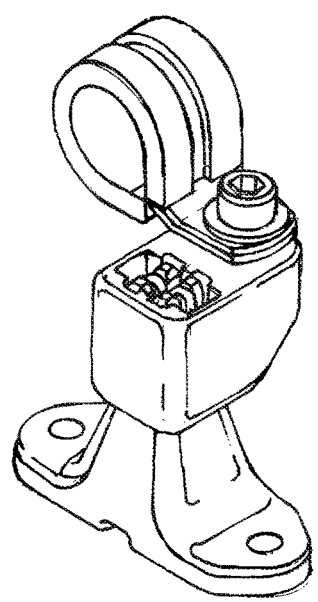

Referring to FIGS. 8H-8J, another coupling mechanism is shown formed as a threaded adapter 650. The threaded adapter 650 is formed at one or more sides 604 of the cable adapter body 602. The threaded adapter 650 includes a platform 652 that extends outward (such as orthogonally) from the side 604 of the cable adapter body 604. The platform 652 can be at one end of the cable adapter body 604 and support walls 654 can couple with and/or extend around the platform 654 to further support the platform 652. A threaded through-hole or opening 656 extends through the platform 652. The bottom surface of the platform 652 is preferably uniform and continuous with the bottom surface of the adapter body 602. As best shown in FIG. 8J, a standard cable clamp can be attached to the coupling mechanism 650 by passing a fastener such as a bolt through the clamp and into the threaded opening 656. An example of a cable clamp is shown in U.S. Pat. No. 8,759,682, which is hereby incorporated by reference. The clamp can be rotated 360° to any position. It can be upright as shown in FIG. 8J to extend above the adapter body 602, or it can be inverted extend along a side of the adapter body 602.

Finally, it is noted that the prong 408 has both an upper curved portion 413 and a lower locking edge 409, whereby the locking edge 409 is described and shown as being part of and integral with the prong 408 and extends across and to the sides of the prong 408 (FIG. 4A). It will be apparent, however, that the locking edge 409 can be formed separate from the prong 408, thereby having a first prong 408 and a second prong, where the resilient first prong 408 has the upper curved portion 413 and the resilient second prong has the lower locking edge 409 and can be positioned to the side(s) of the first prong.

Accordingly, the foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:
1. A cable attachment device, comprising:
a support member having an elongated support post, the elongated support post having an inner column with at least two opposing notches formed along a length thereof and an outer housing around the inner column; and
at least one cable adapter having an inner surface, an outer surface, and a central bore, the central bore configured to slidably receive the support member,
wherein the cable adapter has at least two opposing resilient prongs extending inwardly from the inner surface of the cable adapter into the central bore, and at least one cable attachment member extending outwardly from the outer surface of the cable adapter configured to secure at least one wire or cable thereto, and
wherein the at least two opposing resilient prongs are configured to engage the at least two opposing notches on the inner column of the support member to secure the cable adapter thereto.

2. The cable attachment device of claim 1, wherein the outer housing has a substantially square cross-sectional shape.

3. The cable attachment device of claim 1, wherein the cable attachment device comprises at least two cable adapters, and wherein the outer housing has one end having a lip for engaging the at least two opposing resilient prongs of one of the at least two cable adapters.

4. The cable attachment device of claim 1, wherein the at least one cable adapter is formed of a housing having a top surface having a chamfered edge.

5. The cable attachment device of claim 1, wherein the cable adapter has two opposing tabs and two opposing resilient prongs.

6. The cable attachment device of claim 1, wherein the cable adapter has at least two opposing cable attachment members extending outwardly from opposite sides of the outer surface of the cable adapter.

7. The cable attachment device of claim 1, further comprising at least one cable or wire coupled to the at least one cable attachment member on the cable adapter.

8. The cable attachment device of claim 1, wherein the cable attachment device comprises a plurality of cable adapters inserted onto the support member, and wherein the at least one cable attachment member on each of the plurality of cable adapters is oriented in the same direction or perpendicularly relative to one another.

9. The cable attachment device of claim 1, wherein the support member further comprises a threaded base portion for securing the support member to a stationary base.

10. The cable attachment device of claim 9, wherein the support member further comprises a neck portion adjacent the threaded base portion.

11. The cable attachment device of claim 1, wherein the outer housing has at least one elongated opening formed in at least one side of the outer housing.

12. The cable attachment device of claim 11, wherein the cable adapter further comprises at least one tab extending inwardly from the inner surface of the cable adapter into the central bore, wherein the at least one tab extends into the at least one elongated opening in the outer housing to prevent rotational movement of the cable adapter.

13. The cable attachment device of claim 1, wherein the inner column and the outer housing of the elongated support post are formed integrally as one unitary piece.

14. The cable attachment device of claim 13, wherein the unitary piece is formed of nylon.

15. The cable attachment device of claim 1, wherein the cable adapter and the at least two opposing resilient prongs are formed integrally as one unitary piece.

16. The cable attachment device of claim 15, wherein the unitary piece is formed of nylon.

17. The cable attachment device of claim 1, wherein the support member further includes an attachment base that provides for direct coupling of the support member to another structure.

18. The cable attachment device of claim 17, wherein the structure is an aircraft.

19. A method of securing cables to a structure, the method comprising the steps of:
coupling at least one cable or wire to at least one cable adapter;
attaching a support member to the structure; and
inserting the at least one cable adapter onto the support member to secure the at least one cable or wire to the structure,
wherein the at least one cable adapter has an inner surface, an outer surface, and a central bore, the central bore configured to slidably receive the support member, and wherein the at least one cable adapter further has at least two opposing resilient prongs extending inwardly from the inner surface into the central bore, and at least one cable attachment member extending outwardly from the outer surface configured to secure the at least one cable or wire thereto, and
wherein the support member has an elongated support post which is formed of an outer housing around an inner column having at least two opposing notches formed along a length thereof, and
wherein the at least two opposing resilient prongs on the at least one cable adapter are configured to engage the at least two opposing notches on the inner column of the support member to secure the cable adapter thereto.

* * * * *